(12) United States Patent
Petkanchin

(10) Patent No.: US 10,790,773 B2
(45) Date of Patent: Sep. 29, 2020

(54) DOUBLY FED INDUCTION MOTOR

(71) Applicant: NRG TECH LTD., Sofia (BG)

(72) Inventor: Lachezar Lazarov Petkanchin, Sofia (BG)

(73) Assignee: NRG TECH LTD., Sofia (BG)

( * ) Notice: Subject to any disclaimer, the term of this patent is extended or adjusted under 35 U.S.C. 154(b) by 0 days.

(21) Appl. No.: 16/078,026

(22) PCT Filed: Jan. 30, 2017

(86) PCT No.: PCT/EP2017/051904
§ 371 (c)(1),
(2) Date: Aug. 21, 2018

(87) PCT Pub. No.: WO2017/144238
PCT Pub. Date: Aug. 31, 2017

(65) Prior Publication Data
US 2019/0052212 A1    Feb. 14, 2019

(30) Foreign Application Priority Data
Feb. 23, 2016 (EP) .................................. 16156807

(51) Int. Cl.
*H02P 23/08*    (2006.01)
*H02P 9/00*    (2006.01)
*H02P 23/20*    (2016.01)

(52) U.S. Cl.
CPC ............. *H02P 23/08* (2013.01); *H02P 9/007* (2013.01); *H02P 23/20* (2016.02); *H02P 2207/01* (2013.01); *H02P 2207/076* (2013.01)

(58) Field of Classification Search
CPC .......... H02P 21/14; H02P 23/14; H02P 23/08; H02P 9/007; H02P 23/20; H02P 2207/01; H02P 2207/076
See application file for complete search history.

(56) References Cited

U.S. PATENT DOCUMENTS 4,319,176 A * 3/1982 Akamatsu .............. H02K 19/26
                                                        318/716
4,959,573 A * 9/1990 Roberts .................... H02K 3/16
                                                        310/68 R (Continued)

FOREIGN PATENT DOCUMENTS

EP    2696496    2/2014
EP    2879280    6/2015

OTHER PUBLICATIONS

Written Opinion of the International Searching Authority of PCT/EP2017/051904.

*Primary Examiner* — Rina I Duda
(74) *Attorney, Agent, or Firm* — Reches Patent

(57) ABSTRACT

Electric motor, in particular induction motor, comprising a stator, a rotor and a control device which is arranged at the rotor. The three rotor windings are connected to a Rotor Control device with inverter and controller unit mounted on the rotor. A capacitor is placed in the DC link. The capacitor is supplied from the EMF induced in the rotor. The current in the rotor windings is advanced in order to achieve a 90 degree phase shift between rotor current and stator MMF vector. To achieve this the frequency and amplitude of the rotor current as well as the phase shift can be varied. Wherein the frequency of the rotor inverter is matching the slip frequency.

15 Claims, 4 Drawing Sheets

(56) References Cited

U.S. PATENT DOCUMENTS

| | | | |
|---|---|---|---|
| 4,982,147 A | 1/1991 | Lauw | |
| 2015/0145466 A1 | 5/2015 | Ha | |
| 2015/0349687 A1 | 12/2015 | Liang | |
| 2015/0372751 A1 | 12/2015 | Shinoda | |

* cited by examiner

DOUBLY FED INDUCTION MOTOR

BACKGROUND OF THE INVENTION

Field of the Invention

This invention relates to an electric motor, in particular to an induction motor, and to a method to operate an electric motor, in particular an induction motor.

Background Art

Although synchronous electric motors in general are more efficient than induction electric motors, induction motors are still widely used in many applications. The reasons are low cost, less maintenance and simple design compared to synchronous motors. One of the reasons for lower efficiency of induction motors is the fact that the rotor magnetic flux field is very hard to control in terms of strength and direction. In steady state conditions (constant RPM and torque) the angel between stator MMF (magneto motive force) vector and rotor magnetic flux vector is not at optimal 90° (electrical). As a result from that greater electrical current has to be maintained in stator and rotor leading to ohmic and air gap losses which cuts efficiency and can cause overheating problems. Also it takes considerable amount of time to increase the rotor field when instant torque is required from the motor. The process of additionally exciting the rotor can take up to seconds in which time the motor may stall, leading to variety of problems.

Therefore, it is an object of the current invention to provide an electric motor, in particular an induction motor, with better ability for rotor field vector control, both in terms of direction and strength than prior art induction motors.

BRIEF SUMMARY OF THE INVENTION

This object is achieved by means of an electric motor according to claim 1 and by a method to operate an electric motor according to claim (15). Additional advantages and features of preferred embodiments of the current invention are defined in the dependent claims.

According to the invention, an electric motor, in particular an induction motor, comprises a stator, a rotor and a control device, in particular a rotor control device, which is arranged at the rotor, wherein the stator is adapted to induce EMF (electromotive force) into the rotor during operation, and wherein the control device is adapted to vary the power factor and/or the slip of the rotor based on the induced EMF in the rotor.

Advantageously, the stator comprises no less than three stator windings, and the rotor comprises no less than three rotor windings, into which EMF (electromagnetic force) is induceable and wherein the control device is adapted to vary or adjust at least one of:
  electric currents in rotor windings
  and/or the angle of rotor magnetic flux vector
  and/or the slip of the motor.

The rotor control device is adapted to draw electric energy from rotor windings at appropriate moment of time and to store a part of that energy in the form of electric charge in a rotor energy storage unit, namely a bank of capacitors. Consequently electric potential builds up between the terminals of the rotor energy storage unit.

The energy stored in the rotor energy storage unit is then used to vary the rotor magnetic flux field strength and angle, relative to the rotor itself and/or the slip of the motor by applying electric potential to the rotor windings to modify the current in rotor windings at appropriate moment of time, using the electric potential already built up in the rotor energy storage unit.

Advantageously, the rotor control device is adapted to vary the phase and/or the magnitude/amplitude of the rotor current to adapt the angle and magnitude of the rotor magnetic flux vector, in particular the rotor magnetic flux field. Thus, the current can be shifted forwards or backwards in time for synchronization with the induced EMF in the rotor. In addition, the level, magnitude or amplitude of the current can be increased or decreased which means that the current in the windings can be varied/modulated.

Further, the rotor control device is preferably adapted to vary the frequency and/or the magnitude/amplitude of the rotor current to adapt the slip. The slip frequency is defined as the difference between stator MMF vector rotation (synchronous) frequency and actual shaft rotation frequency. The slip is defined as the ratio of slip frequency over synchronous frequency. Slip varies from zero at synchronous speed and one when the rotor is at rest.

According to one embodiment the rotor comprises a plurality of rotor windings, respectively, electrically connected to the rotor control device. More precisely, electrically connected to a rotor inverter unit as part of the rotor control device. According to a preferred embodiment, three rotor windings are wound at 120° pitch to each other and are connected in star or delta connection. This way, three-phase AC will be induced into the three rotor windings due to rotating stator magnetic field around rotor windings. Frequency of the EMF in the rotor is equal to the slip frequency. The rotor control device is adapted to phase shift electrical current in all three rotor windings so that the current in any winding is preferably in phase with the induced EMF in it. However the induced EMF in the rotor is always delayed by electric 90° relative to the rotating stator MMF vector (according to Faraday's law of electromagnetic induction). Also the rotor magnetic flux vector is directly proportional to the rotor current vector. This way if rotor AC current is kept in phase with the induced EMF the rotor magnetic flux vector will also be delayed by exactly 90° electrical in relation to the stator MMF vector. This condition is ideal, as maximum torque per unit current is achieved exactly when rotor flux vector and stator MMF vector are at 90° electrical. Clearly, this is not true for standard induction motors, where there is an additional delay in rotor current and hence of the rotor flux vector, namely 90°+$\phi$ relative to the stator MMF vector and always the offset angle $\phi$>0. That is because the prior art rotor consists of a number of purely RL (inductive resistive) electric loops, causing a delay of current in every loop of the rotor with respect to the induced EMF in the loop. In other words, the power factor of the rotor loops in prior art is less than 1, which offsets the rotor flux vector not to be at 90° with respect to stator MMF vector.

According to one embodiment the rotor control device comprises a rotor controller unit a rotor inverter unit, an energy storage unit, a communication unit, and/or an electric potential measuring unit. Preferably, the rotor control device comprises an accelerometer sensor capable of measuring tangential and/or radial acceleration.

As the rotor is adapted to operate at a variety of slip frequencies it is not appropriate to use passive elements (like simple capacitors) or simple RL circuits to correct the phase of rotor current. Therefore, the rotor control device contains a controller unit which is preferably an active programmable device comprising at least one control loop, for example a PI (Proportional Integral) control loop, and/or at least one rotor inverter unit. According to one embodiment, every PI control loop comprises a feedback or a loop controller. The feedback is provided by current sensors on rotor windings, electric potential sensor on the energy storage unit and other sensors like temperature sensor, shaft position encoder, accelerometer or other. In particular, the rotor controller unit is adapted to operate the PI control loops and/or the rotor inverter unit(s). The whole system is expediently arranged at the rotor and therefore spins or rotates with the rotor. The switching unit comprises a power supply unit that is adapted to power the rotor controller unit with DC.

Preferably, the rotor control device having a controller unit, energy storage device and a rotor inverter unit, which comprises for example a plurality of transistors and diodes. The windings of the rotor are electrically connected to the rotor inverter unit.

Furthermore, the control device comprises a power supply unit adapted to power the rotor controller unit with appropriate DC power, in particular needed for its operation. The windings of the rotor are also electrically connected to the power supply unit.

According to a preferred embodiment, the energy storage unit comprises at least one capacitor. These components are preferably also connected to the windings of the rotor. Electric potential measuring sensor is attached to both terminals of the energy storage unit and passes information to rotor controller unit. Also a switchable resistor is connected to the energy storage unit. In case too much energy is accumulated in the energy storage unit part of that energy can be dissipated as heat via the switchable resistor According to one embodiment, the energy storage unit is a capacity bank in which electric energy is stored in the form of electric charge. This energy is then used to appropriately modulate frequency and/or magnitude/amplitude of rotor current vector so that it is kept as close as possible to 90° with respect to the stator MMF vector. In steady condition, rotor inverter module outputs sinusoidal PWM duty cycle, managed by the rotor controller unit which brings rotor current to come earlier and by doing so eliminates phase lag of rotor current in its otherwise purely RL circuits. Frequency generated by the rotor inverter is kept equal to instantaneous slip frequency. When the rotor inverter increases its three-phase frequency, the slip frequency also equally increases. More slip brings greater induced EMF in the rotor and the current in the rotor windings also increases which increases rotor flux. If the rotor inverter decreases its three-phase frequency, the slip frequency also equally decreases. Less slip brings drop in induced EMF in the rotor and the current in the rotor windings also drops which decreases rotor flux. Also the rotor flux can be varied by adjusting the rotor inverter module duty cycle without having to adjust the slip. In this manner, the rotor flux can be advantageously varied depending on demanded torque.

The stator control device is adapted to provide AC to the stator. According to one embodiment the stator control device comprises also stator controller unit with at least one control loop built in it, for example a PI (Proportional Integral) control loop, and/or at least one inverter unit.

According to one embodiment, the stator control device module is adapted to vary frequency, phase and/or the magnitude/amplitude of the current or voltage of the stator.

In a preferred embodiment the rotor control device and rotor controller unit in particular can be programmed to adjust the slip and other rotor parameters based on built in logic (PI control loops). In another embodiment the rotor control device can receive external commands via wireless communication unit and adjust the slip and other rotor parameters accordingly. In such embodiment the PI control loops are run outside the rotor. Preferably the stator control device and its integrated programmable stator controller unit run PI loops outside the rotor. Also the rotor control device sends information regarding rotor status and condition to the outside world or/and to the stator control device via the same wireless communication unit. Such information is used as part of the feedback to the PI loops running in stator controller unit. Another part of the feedback is data from stator current sensors (80). Preferably, the rotor control device is powered entirely by the induced EMF in the rotor by the stator rotating field and does not need any additional power transfer modules like slip rings or electromagnetic exciters.

According to one embodiment, the induction motor comprises a rotor switching unit adapted to electrically connect the rotor windings to the rotor inverter unit in variety of alternatively selectable configurations. Preferably, the rotor switching unit is adapted to change a magnetic pole number of the rotor.

Preferably, the electric motor can be operated as motor and/or as generator.

According to one embodiment, the rotor and/or the stator can also be provided with pole number switching units to advantageously change the pole numbers of the induction motor during operation to optimize efficiency with respect to momentary RPM and torque requirements. A rotor switching unit is preferably attached to the rotor which means that it also rotates/spins with the rotor. In such embodiment rotor switching unit is part of the rotor control device and is commanded by the rotor controller unit. According to a preferred embodiment, the rotor switching unit does also not need any slip rings. In such embodiment rotor and stator contain preferably 6 windings each. Windings are distributed at 60° pitch on rotor and stator. Rotor and stator switching units can simultaneously electrically connect rotor and stator windings to respectively rotor and stator inverter units in delta configuration to operate the induction motor in four magnetic poles configuration. Also rotor and stator switching units can be alternatively switched to electrically connect rotor and stator windings respectively to rotor and stator inverter units in double star configuration to operate the induction motor in two magnetic poles configuration. Other embodiments with different number of alternatively switchable rotor and stator magnetic pole number sets are also possible and preferred. Magnetic pole number switching takes place in three steps performed in quick succession:

When RPM drop below a pre-set point both rotor and stator controllers switch off the duty cycle of rotor and stator inverters.

Both rotor and stator switching units are commanded to switch rotor and stator windings to four magnetic poles position (delta configuration).

Both rotor and stator inverters resume their duty cycle at double their initial frequencies each.

Likewise switching from four to two magnetic poles takes place in a similar fashion when RPM exceeds a pre-set point, however the duty cycle of rotor and stator inverters resume at half their initial frequencies each. Frequency adjustment is important to synchronize rotation velocity of stator MMF vector and rotor field vector with the actual shaft rotation velocity, which remains almost unchanged during the magnetic pole number switching process. However the physical rotation velocity of both vectors would change because of magnetic pole number change and needs adjustment to match again with the shaft rotation velocity. The process of magnetic pole number switching is synchronized over the communication unit to take place simultaneously on the rotor and the stator.

According to one embodiment, the induction motor comprises at least one position angle encoder, wherein the at least one position angle encoder is a shaft position angle encoder. Thus the rotor current vector is known exactly from measurements taken on the rotor itself and adding the angle of the shaft known from position angle encoder. In another embodiment a sensorless method is used to determine the angle of the rotor flux vector.

According to one embodiment, the induction motor comprises at least one current sensor, wherein preferably at least two current sensors are positioned in the windings of the rotor.

According to one embodiment the induction motor comprises a stator control device which is electrically connected to the stator windings, wherein the inverter module operated by stator controller unit which is a programmable device. Preferably stator controller unit can exchange information with rotor controller unit via the communication unit. In one embodiment the communication unit can be a wire- or wireless-based communication unit. In another embodiment rotor and stator control devices are equipped with encoding/decoding units which impose additional low power modulated high frequency signal to rotor and stator windings.

Messages are FM encoded in this variable high frequency, which passes through the air gap by inducing small EMF with the same FM frequency in the opposite windings. The signal is filtered out on the other end out of the opposite windings, decoded by the corresponding encoding/decoding unit. This way rotor and stator control devices can exchange information without the need of additional antennas or wires.

The invention refers also to a method to operate an electric motor, in particular an induction motor, having a stator and a rotor, comprising the step
  using EMF induced to the rotor and/or energy stored in the energy storage device to vary magnitude/amplitude, frequency and/or phase of the rotor current.

According to one embodiment the method comprises the steps:
  using EMF induced in the rotor windings to store electric energy in the energy storage unit
  using energy stored in energy storage unit and demanded torque or/and RPM to modify, adjust electric current in rotor windings
  Using information sent from the rotor control device via the communication unit and demanded torque or/and RPM to adjust electric currents in stator windings.
  Using information from all sensors and demanded torque or/and RPM to select and switch to adequate magnetic pole number on rotor and stator.
  Generating EMF in rotor windings by pulsating, nonrotating stator MMF vector.

The features and advantages presented with regard to the electric motor according to the invention apply also to the methods according to the invention and vice versa.

A starting procedure of the electric motor may be as follows. Initially, there is no current in the rotor and the stator. Then, the stator control device module generates a pulsating (not rotating) MMF vector in the stator by modulating constant low duty cycle on the stator inverter unit. This can be done by simply by switching "on" and "off" only one of the six transistors of the stator inverter unit. As this so generated MMF vector is not rotating there is no torque acting in the shaft, only small radial forces acting on the rotor will be generated. Relatively small EMF is induced in the rotor windings due to the stator pulsating MMF vector. As the MMF vector is not rotating there will be no torque on the shaft. Diodes of the rotor inverter unit act as rectifiers and the energy storage unit (capacitor(s)) receive(s) electric charge leading to build up of electric potential between its terminals. The power supply device is activated by the electric potential from the capacitor(s) and outputs precisely conditioned DC power to the rotor controller unit. Rotor controller unit boots up and sends "ready" signal to stator controller unit via the communication unit.

After this state is achieved the electric motor still generates no torque, but it is in 'stand by' mode and ready to operate. When rotating stator MMF vector is initiated in the stator with rotating frequency above some minimal slip frequency there will be torque on the shaft and eventual rotation. Commanded torque and/or RPM are received via the external interface, connected to stator control device.

In the following, different operation modes are described using the subsequent expressions:

$f_{stator}$ three phase frequency generated by stator inverter unit, also stator MMF vector rotation frequency.

$f_{rotor}$ three phase frequency generated by rotor inverter unit, equal to slip frequency $f_{shaft} = f_{stator} - f_{rotor}$ shaft rotating frequency (physical rotation frequency of motor shaft)

$\omega_{rotor} = 2\pi f_{rotor}$ rotor flux vector angular velocity, relative to the rotor itself $\omega_{stator} = 2\pi f_{stator}$ stator MMF vector angular velocity $\omega_{shaft} = 2\pi f_{shaft} = \omega_{stator} - \omega_{rotor}$ physical shaft angular velocity $\vec{I}_{stator}$ stator current vector, directly proportional to stator MMF vector $\vec{I}_{rotor}$ rotor current vector, directly proportional to rotor flux vector $\tau(\vec{I}_{rotor}, \vec{I}_{stator})$ instantaneous torque, derived from vector rotor and stator current $\Theta(\vec{I}_{rotor}, \vec{I}_{stator})$ angle between rotor and stator current vectors, also equal to the angle between rotor and stator flux vectors.

Field Oriented Control Operation—Using Current Sensors

First step: measuring of stator and rotor currents in two phases each using current sensors.

Second step: estimating magnetic flux angles of rotor and stator $\Theta(\vec{I}_{rotor}, \vec{I}_{stator})$ (knowing two measured rotor phase currents and two stator phase currents). Rotor flux angle is determined by adding the angle of rotor physical position and rotor flux angle with respect to the rotor itself. Rotor physical instantaneous position is determined from rotor position angle encoder. Rotor flux angle with respect to the rotor itself is estimated on the basis of two measured currents in two rotor windings. Also sensorless methods to estimate the angle $\Theta(\vec{I}_{rotor}, \vec{I}_{stator})$ are known from the prior art. It is known that the angle between rotor and stator flux vectors affects stator current phase shift (back EMF). The rotor flux vector on its turn also induces EMF in the stator. This back EMF creates an additional current vector in the stator affecting the overall phase shift in the stator. By measuring this influence, methods exist to estimate values for the angle between rotor and stator flux from measured corresponding stator electrical current values, their phase shift and angular velocity. Preferably, the rotor current vector $\vec{I}_{rotor}$ is known exactly from measurements taken on the rotor itself, whereas in prior art it is estimated from the effects caused in the stator which is a lot slower and which is an inaccurate method.

Third step: If the angle between rotor and stator flux vectors $\Theta(\vec{I}_{rotor}, \vec{I}_{stator})$ is less than 90°, then at least one of the following steps is performed:

- the rotor controller unit commands rotor inverter unit to reduce the angular velocity $\omega_{rotor}$ of the rotor three-phase current. Such action will decrease slip, increase shaft RPM ($\omega_{shaft}$) and will bring the angle between rotor and stator flux vectors $\Theta(\vec{I}_{rotor}, \vec{I}_{stator})$ closer to 90°; such action is not possible with prior art induction motors;
- commanding the stator inverter to increase stator angular velocity $\omega_{rotor}$, such action will also increase shaft RPM or $\omega_{shaft}$;
- commanding the stator inverter to decrease stator duty cycle; such action will keep RPM and decrease torque.

If the angle between rotor and stator flux vectors $\Theta(\vec{I}_{rotor}, \vec{I}_{stator})$ is greater than 90∞, then at least one of the following steps is performed:

- the rotor controller unit commands rotor inverter unit to increase frequency of the rotor three phase current ($\omega_{stator}$) to advance rotor current vector. Such action will increase slip, decrease shaft RPM ($\omega_{shaft}$) and will bring the angle between rotor and stator flux vectors $\Theta(\vec{I}_{rotor}, \vec{I}_{stator})$ closer to 90°; such action is not possible with prior art induction motors;
- commanding the stator inverter to reduce stator frequency ($\omega_{stator}$); such action will also decrease shaft RPM or $\omega_{shaft}$;
- commanding the stator inverter to increase stator duty cycle; such action will increase torque;

If necessary, repeating at least one of the preceding steps.

Field Oriented Control Operation—Using PI Control Loops

Motor control can be done using Proportional Integral (PI) control loops:

- In a first control loop, an angle $\Theta(\vec{I}_{rotor}, \vec{I}_{stator})$ is compared to 90°. If $\Theta(\vec{I}_{rotor}, \vec{I}_{stator})<90°$ an error message is fed to a PI controller which adequately decreases $\omega_{rotor}$. Otherwise the PI controller adequately increases $\omega_{rotor}$.
- In a second control loop, instantaneous torque is estimated from the values of rotor and stator currents and the assumption that their vectors are at 90°. Instantaneous torque $\tau(\vec{I}_{rotor}, \vec{I}_{stator})$ is compared to commanded torque and error message is fed to a PI controller. If more torque is needed than the stator inverter is commended to adequately increase its duty cycle, which eventually will increase stator and rotor currents, reflecting in higher torque.
- In a third control loop, commanded RPM is compared to $\omega_{stator}-\omega_{rotor}$ which is actual shaft angular velocity—$\omega_{shaft}$. If measured $\omega_{shaft}$ is less than commanded, the stator inverter is commanded to adequately increase its frequency. Otherwise the opposite command is given.

BRIEF DESCRIPTION OF THE SEVERAL VIEWS OF THE DRAWINGS

Additional advantages and features of the current invention are shown in the following description of preferred embodiments of the current invention with reference to the attached drawings. Single features or characteristics of respective embodiments are explicitly allowed to be combined within the scope of the current invention.

DETAILED DESCRIPTION OF THE INVENTION

Figure 1:
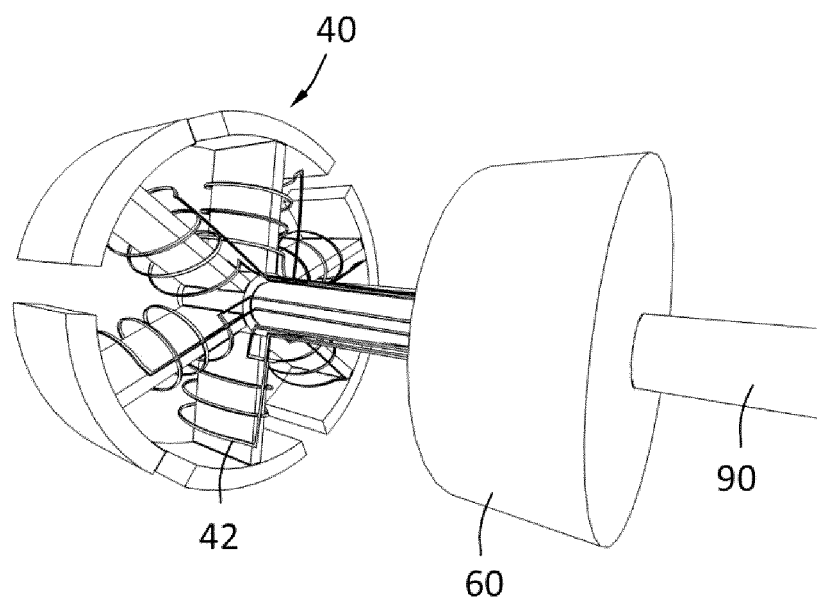
FIG. 1 shows a perspective schematic view of an electric motor comprising a rotor control device attached to the rotor.

FIG. 1 shows a schematic, perspective view of a motor with a rotor 40 comprising a shaft 90. A control device 60 is attached to the rotor 40 or the shaft 90, respectively. The rotor 40 comprises a rotor winding 42 comprising three windings 42 which are mounted at 120° to each other and which can be connected in star or in delta connection. This way, three-phase AC can be induced into the three windings 42 due to a rotating magnetic field of a stator (not shown). The control device 60 is adapted to correct power factor and slip by varying the phase and/or magnitude/amplitude of rotor three phase current.

Figure 2A:
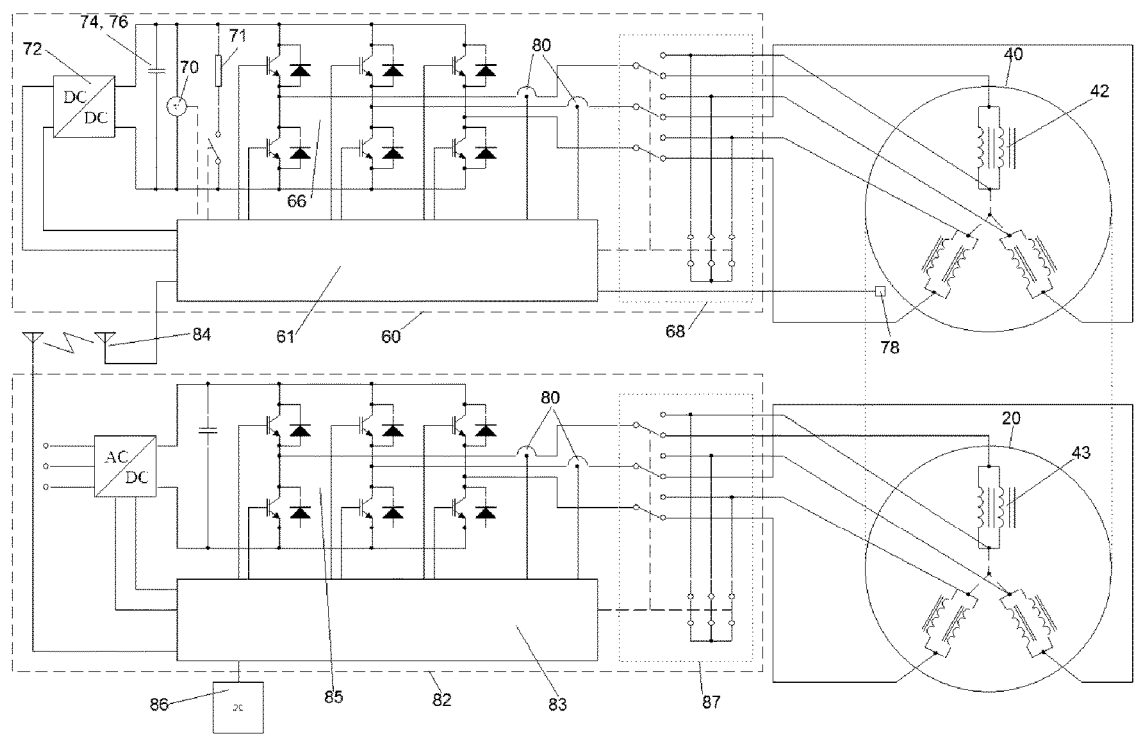
FIG. 2a shows a design scheme of one embodiment of the electric motor with rotor and stator switching units connecting rotor and stator windings in double star configuration.
Figure 2B:
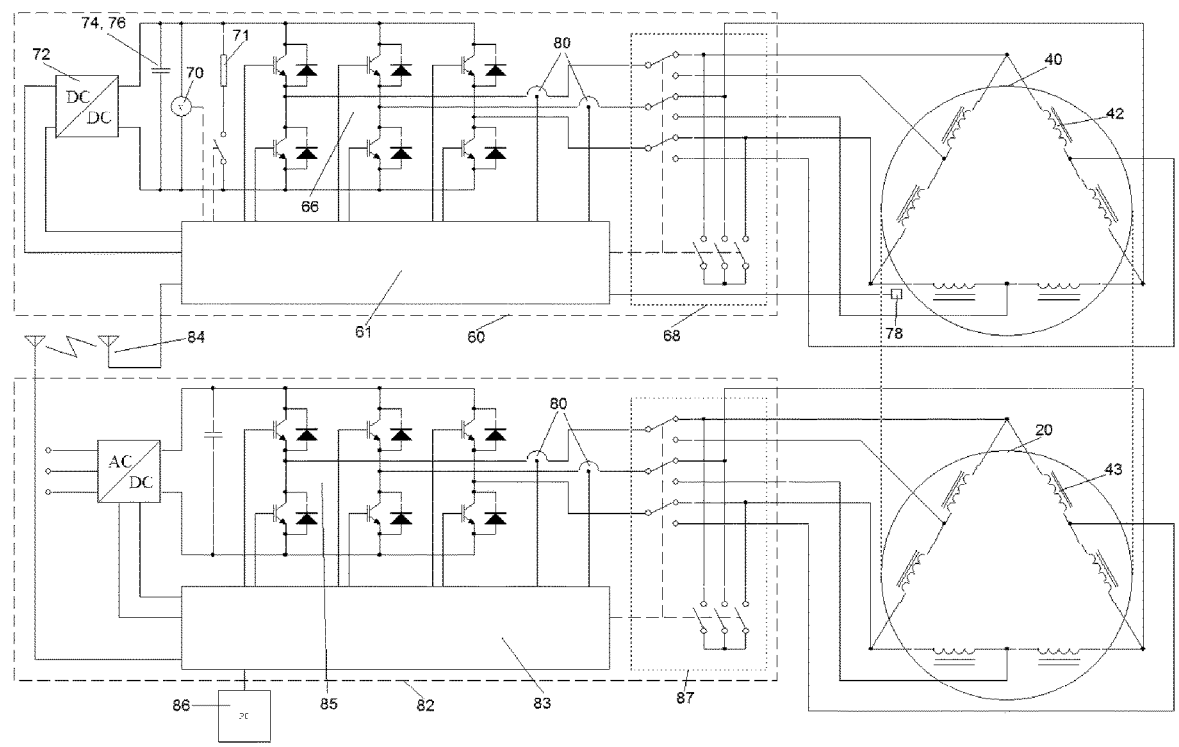
FIG. 2b shows a design scheme of one embodiment of the electric motor with rotor and stator switching units connecting rotor and stator windings in delta configuration.

FIGS. 2a, b show a design scheme of an embodiment of an electric motor according to the invention motor with rotor and stator switching units connecting rotor and stator windings in double star configuration (FIG. 2a) and in delta configuration m (FIG. 2b). A rotor 40 comprises a rotor winding 42 comprising/forming three phases. The rotor 40 is combined with a control device 60. The control device 60 comprises a controller unit 61 which is supported by a power supply unit 72 and an energy storage unit 74 comprising at least one capacitor 76. The control device 60 comprises a rotor inverter unit 66 comprising a plurality of transistors 68 and diodes 70. The rotor inverter unit 66 is electrically connected to the rotor winding 42 or the appropriate phases, respectively. At least two phases of the rotor 40 are provided with a current sensor 80. In addition, the rotor 40 comprises a rotor angle encoder 78. The controller unit 61 or the control device 60, respectively, are connected to a rotor control device 82 by a communication unit 84. The rotor control device 82 is electrically connected to a stator 20 which comprises also three phases wherein at least two phases comprise a current sensor 80. The rotor control device 82 is connected to a three phase AC system.

Figure 3:
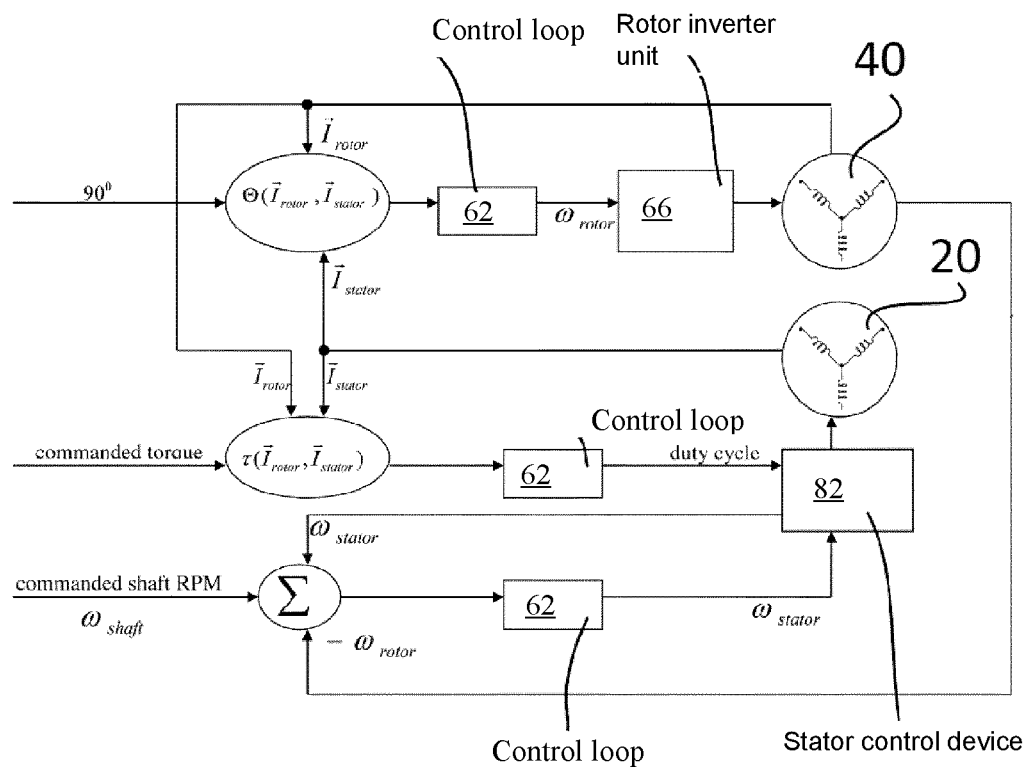
FIG. 3 shows a chart which visualizes different methods to operate the electric motor.

FIG. 3 shows a chart which visualizes different methods to operate an electric motor. A control loop 62, preferably a PI control loop 62, and a rotor inverter unit 64 are connected to a rotor 40. They process $\vec{I}_{rotor}, \vec{I}_{stator}$ and $\Theta$. Two control loops 62, preferably two PI control loops 62, are connected to a stator 20. They process $\vec{I}_{rotor}, \vec{I}_{stator}, \omega_{stator}, \omega_{rotor}, \omega_{shaft}, \tau$ and commanded torque or commanded shaft RPM, respectively. With regard to FIG. 3, different operation modes are described.

Field Oriented Control Operation—Using Current Sensors

First step: measuring of stator and rotor currents in two phases each using current sensors 80.

Second step: estimating magnetic flux angles of rotor and stator $\Theta(\vec{I}_{rotor}, \vec{I}_{stator})$ (knowing two measured rotor phase currents and two stator phase currents). Rotor flux angle is determined by adding angle of rotor physical position and rotor flux angle. Rotor physical instantaneous position is determined from rotor position angle encoder 78. Also sensorless methods to estimate the angle $\Theta(\vec{I}_{rotor}, \vec{I}_{stator})$ are known from prior art. It is known that the angle between rotor and stator flux vectors affects stator current phase shift (back EMF). The rotor flux vector on its turn also induces EMF in the stator 20. This back EMF creates an additional current vector in the stator affecting the overall phase shift in the stator. By measuring this influence, methods exist to estimate values for the angle between rotor 40 and stator 20 flux from measured corresponding stator electrical current values, their phase shift and angular velocity. In the present invention the rotor current vector $\vec{I}_{rotor}$ is known exactly from measurements taken on the rotor 40 itself, whereas in prior art it is estimated from the effects caused in the stator which is a lot slower and inaccurate method.

Third step: If the angle between rotor and stator flux vectors $\Theta(\vec{I}_{rotor}, \vec{I}_{stator})$ is less than 90°, then at least one of the following steps is performed:

the rotor controller unit 61 commands rotor inverter unit 64 to reduce the angular velocity $\omega_{rotor}$ of rotor three phase current. Such action will decrease slip, increase shaft RPM ($\omega_{shaft}$) and will bring the angle between rotor and stator flux vectors $\Theta(\vec{I}_{rotor}, \vec{I}_{stator})$ closer to 90°. Such action is not possible with prior art induction motors;

commanding the rotor control device 82 to increase stator angular velocity $\omega_{rotor}$. Such action will also increase shaft RPM or $\omega_{shaft}$;

commanding the rotor control device 82 to decrease stator duty cycle. Such action will keep RPM and decrease torque.

If the angle between rotor and stator flux vectors $\Theta(\vec{I}_{rotor}, \vec{I}_{stator})$ is greater than 90°, then at least one of the following steps is performed:

the rotor controller unit 61 commands rotor inverter unit 66 to increase frequency of rotor three phase current ($\omega_{stator}$) to advance rotor current vector. Such action will increase slip, decrease shaft RPM ($\omega_{shaft}$) and will bring the angle between rotor and stator flux vectors $\Theta(\vec{I}_{rotor}, \vec{I}_{stator})$ closer to 90°; such action is not possible with prior art induction motors;

commanding the rotor control device 82 to reduce stator frequency ($\omega_{stator}$); such action will also decrease shaft RPM or $\omega_{shaft}$;

commanding the rotor control device 82 to increase stator duty cycle; such action will increase torque;

If necessary, repeating at least one of the preceding steps.

Field Oriented Control Operation—Using PI Control Loops

Motor control can be done using Proportional Integral (PI) control loops:

In a first control loop 62, angle $\Theta(\vec{I}_{rotor}, \vec{I}_{stator})$ is compared to 90°. If $\Theta(\vec{I}_{rotor}, \vec{I}_{stator}) < 90°$ an error message is fed to a PI controller 62 which adequately decreases $\omega_{rotor}$. Otherwise PI controller 62 adequately increases $\omega_{rotor}$.

In a second control loop 62, instantaneous torque is estimated from the values of rotor and stator currents and the assumption that their vectors are at 90°. Instantaneous torque $\tau(\vec{I}_{rotor}, \vec{I}_{stator})$ is compared to commanded torque and error message is fed to a PI controller 62. If more torque is needed than rotor control device 82 is commended to adequately increase its duty cycle, which eventually will increase stator and rotor currents, reflecting in higher torque.

In a third control loop 62, commanded RPM is compared to $\omega_{stator} - \omega_{rotor}$, which is actual shaft angular velocity–$\omega_{shaft}$. If measured $\omega_{shaft}$ is less than commanded, stator control device 82 is commanded to adequately increase stator frequency. Otherwise the opposite command is given.

Figure 4:
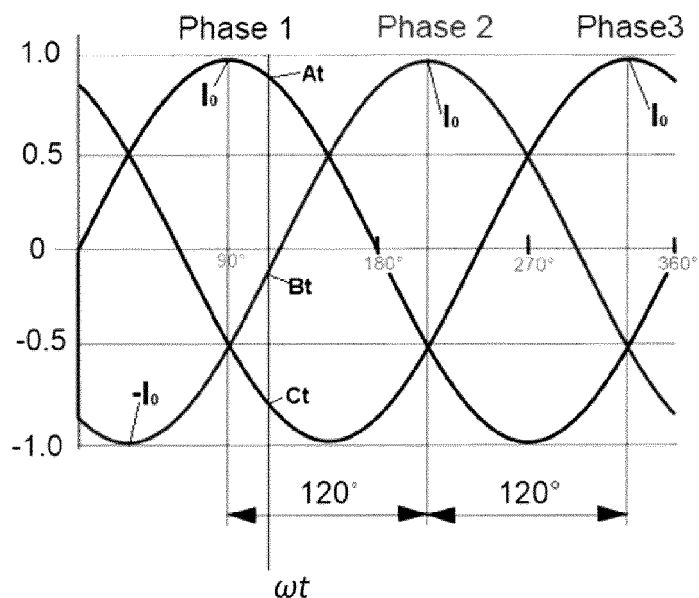
FIG. 4 shows a method to estimate magnetic flux angle from values of two known currents from three-phase current.

FIG. 4 shows a method to estimate magnetic flux angle from values of two known currents from three-phase current.

$$I_0 \sin(\omega t) = A_t$$
$$I_0 \sin\left(\omega t + \frac{2}{3}\pi\right) = B_t,$$

Wherein $A_t$ is instantaneous current value in phase A and $B_t$ is instantaneous current value in phase B.

If $\sin(\omega t) = 0$, $A_t = 0$ and current angle $\omega t = 0$.

If $\sin(\omega t) \neq 0$, the current angle can be calculated as follows:

$$I_0 \sin(\omega t) = A_t \Rightarrow I_0 = \frac{A_t}{\sin(\omega t)}$$

$$I_0 \sin\left(\omega t + \frac{2}{3}\pi\right) = B_t \Rightarrow I_0 \sin(\omega t) \cos\left(\frac{2}{3}\pi\right) + I_0 \cos(\omega t) \sin\left(\frac{2}{3}\pi\right) = B_t$$

Substituting $$\sin\left(\frac{2}{3}\pi\right) = \frac{\sqrt{3}}{2};$$

$$\cos\left(\frac{2}{3}\pi\right) = -\frac{1}{2};$$

$$I_0 = \frac{A_t}{\sin(\omega t)}$$

$$A_t \frac{\sqrt{3}\cos(\omega t)}{2\sin(\omega t)} - \frac{A_t}{2} = B_t \Rightarrow \cot(\omega t) = \frac{2B_t + A_t}{A_t \sqrt{3}}$$

momentary current vector angle $\omega t = \cot^{-1}\left[\frac{2B_t + A_t}{A_t \sqrt{3}}\right]$

REFERENCE NUMERALS

20 stator
40 rotor
42 rotor winding
43 stator winding
60 rotor control device
61 rotor controller unit
62 (PI) control loop, (PI) controller
66 rotor inverter unit
68 rotor switching unit
70 electric potential measuring sensor
71 switchable resistor
72 power supply unit
74 energy storage unit
76 capacitor
78 shaft angle encoder 80 current sensor
82 stator control device
83 stator controller unit
85 stator inverter unit
86 external interface
87 stator switching unit
84 communication unit
85 stator inverter unit
90 shaft
P power
I current
ε EMF
ω angular velocity
ωt current vector angle
$A_t$ instantaneous current value in phase A
$B_t$ instantaneous current value in phase B

I claim:

1. Doubly fed electric motor, comprising a stator (20), a rotor (40), and a control device (60) which is arranged at the rotor (40), wherein the stator (20) is adapted to induce electromotive force (EMF) into the rotor (40) during operation, and wherein the rotor (40) has no less than three rotor windings (42), into which EMF is induceable, and which are electrically connected to the control device (60), and wherein the stator (20) has no less than three stator windings (43), and the control device (60) is adapted to vary the power factor based on and using the induced EMF in the rotor, and to vary or adjust at least one of electric currents in the rotor windings (42), and the angle of rotor magnetic flux vector, characterized in that the control device (60) is adapted to vary the phase, frequency, and/or the magnitude/amplitude of the rotor current using EMF induced to the rotor in such a way to achieve an optimum angle of 90° between the rotor magnetic flux vector and the stator magnetomotive force (MMF) vector.

2. Doubly fed electric motor according to claim 1, wherein the control device (60) is adapted to vary the frequency and/or the magnitude/amplitude of the rotor current to adapt the slip.

3. Doubly fed electric motor according to claim 1, wherein the rotor control device (60) comprises a rotor controller unit (61), a rotor inverter unit (66), an energy storage unit (74), a communication unit (84), and/or an electric potential measuring unit.

4. Doubly fed electric motor according to claim 3, wherein the rotor controller unit (61) is an active control device comprising at least one PI control loop (62).

5. Doubly fed electric motor according to any of the claim 3, wherein the energy storage unit (74) is connected to a switchable resistor.

6. Doubly fed electric motor according to claim 1, wherein the rotor control device (60) comprises an accelerometer sensor capable of measuring tangential and/or radial acceleration.

7. Doubly fed electric motor according to claim 1, wherein a switching unit (68) comprises a plurality of transistors and diodes.

8. Doubly fed electric motor according to claim 1, wherein the control device (60) comprises an power supply unit (72) adapted to power the rotor controller unit (61) with DC.

9. Doubly fed electric motor according to claim 1, comprising a rotor switching unit (68) adapted to electrically connect the rotor windings (42) to the rotor inverter unit (66) in variety of alternatively selectable configurations.

10. Doubly fed electric motor according to claim 9, wherein the rotor switching unit (68) is adapted to change a magnetic pole number of the rotor (40).

11. Doubly fed electric motor according to claim 1, comprising at least one position angle encoder, wherein the at least one position angle encoder is a rotor position angle encoder (78).

12. Doubly fed electric motor according to claim 1, comprising at least one current sensor (80), wherein preferably at least two current sensors (80) are positioned in the windings of the rotor (40).

13. Doubly fed electric motor according to claim 1, comprising a stator control device (82) which is electrically connected to the stator (20), and wherein the stator control device (82) is preferably connected to the rotor control device (60) via a communication unit (84).

14. Doubly fed electric motor according to claim 13, wherein the stator control device (82) is adapted to vary frequency, phase and/or the magnitude/amplitude of the current or voltage of the stator (40).

15. Method to operate a doubly fed electric motor, having a stator (20) with no less than three stator windings (43), a rotor (40) comprising no less than three rotor windings (42), into which EMF is induceable, and a control device (60) which is arranged at the rotor (40), wherein the rotor windings (42) are electrically connected to the control device (60), wherein the control device (60) varies the power factor based on and using the induced EMF in the rotor, and varies or adjusts at least one of: electric currents in the rotor windings (42), and and/or the angle of rotor magnetic flux vector, characterized in that the control device (60) varies the phase, frequency and/or the magnitude/amplitude of the rotor current using EMF induced to the rotor in such a way to achieve an optimum angle of 90° between the rotor magnetic flux vector and the stator magnetomotive force (MMF) vector;

wherein the method comprises the steps of: using EMF induced in the rotor windings (42) to store electric energy in the energy storage unit (74, 76);

using energy stored in energy storage unit (74, 72) and demanded torque or/and RPM to modify, adjust electric current in rotor windings (42);

using information sent from the rotor control device via the communication unit (84) and demanded torque or/and RPM to adjust electric currents in stator windings;

using information from sensors such as current sensors on the rotor windings, electric potential sensors on the energy storage unit, temperature sensors, shaft position encoders, or accelerometer sensors, and demanded torque or/and RPM to select and switch to adequate magnetic pole number on rotor and stator; and generating EMF in rotor windings by pulsating, nonrotating stator magnetomotive force (MMF) vector.

* * * * *